United States Patent [19]

Stiver et al.

[11] Patent Number: 5,793,881
[45] Date of Patent: Aug. 11, 1998

[54] IDENTIFICATION SYSTEM

[76] Inventors: John A. Stiver, 30000 45th Pl. South, Auburn, Wash. 98001; Dwight C. Peterson, 9317—58th Ave. Ct. E., Puyallup, Wash. 98371

[21] Appl. No.: 521,796

[22] Filed: Aug. 31, 1995

[51] Int. Cl.⁶ ........................................................ G06K 9/00
[52] U.S. Cl. .................................... 382/115; 382/116
[58] Field of Search ................................ 382/115, 124, 382/126, 127, 116

[56]  References Cited

U.S. PATENT DOCUMENTS

| | | | |
|---|---|---|---|
| 3,648,240 | 3/1972 | Jacoby et al. | 340/146.3 |
| 4,699,149 | 10/1987 | Rice | 128/664 |
| 4,785,171 | 11/1988 | Dowling, Jr. et al. | 250/227 |
| 4,857,916 | 8/1989 | Bellin | 340/825 |
| 4,932,776 | 6/1990 | Dowling, Jr. et al. | 356/71 |
| 4,946,276 | 8/1990 | Chilcott | 356/71 |
| 5,088,817 | 2/1992 | Igaki et al. | 356/71 |
| 5,103,486 | 4/1992 | Grippi | 382/116 |
| 5,230,025 | 7/1993 | Fishbine et al. | 382/4 |
| 5,335,288 | 8/1994 | Faulkner | 382/4 |
| 5,351,303 | 9/1994 | Willmore | 382/2 |

*Primary Examiner*—Jose L. Couso
*Assistant Examiner*—Anh Hong Do
*Attorney, Agent, or Firm*—Jensen & Puntigam P.S.

[57]  ABSTRACT

A system for identifying an individual by having the person grasp an object which contains a means for detecting the structure and other characteristics of the hand and comparing these unique characteristics with those previously recorded and stored in memory.

6 Claims, 6 Drawing Sheets

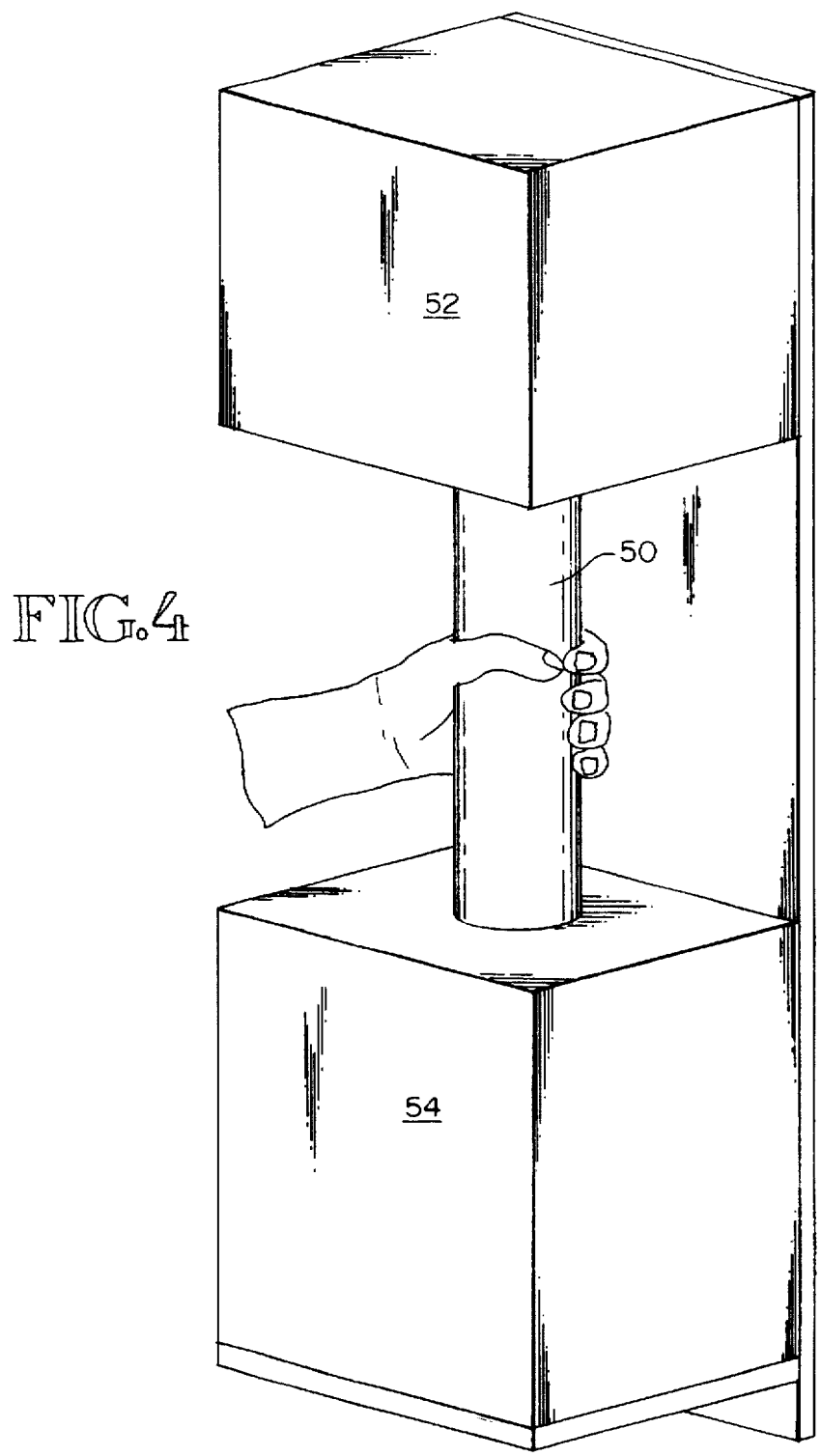

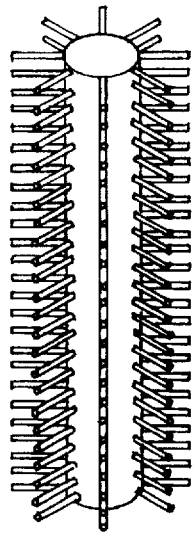
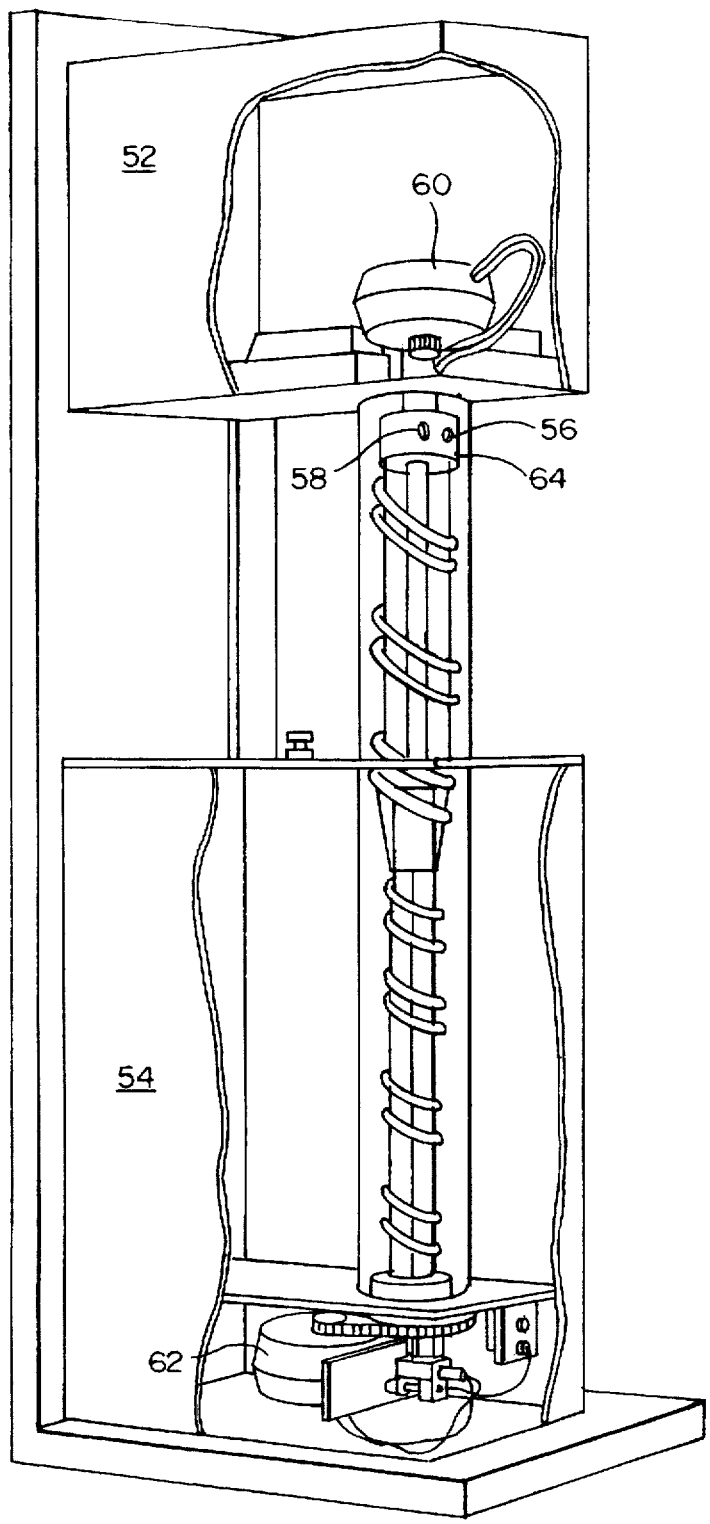
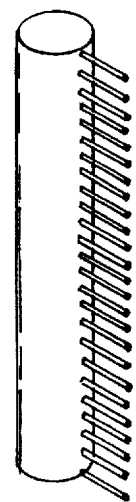

IDENTIFICATION SYSTEM

TECHNICAL FIELD

This invention relates to personal identification systems, and more particularly, to a personal identification system which has the capability of detecting subcutaneous portions as well as other characteristics of a person's hand, storing this information at an accessible location and then quickly making a comparison with currently detected data for identification purposes.

BACKGROUND ART

Personal identification systems have been in existence for a substantial amount of time and they're used for any number of differing operations including identifying an individual for check cashing purposes, for admission to secured locations and any number of other purposes. In each of these methods, including the picture ID, the personal identification number, the reading of the dimensions of a person's hand and/or print are subject to avoidance or misuse. Further, currently known devices are slow and/or awkward to use, and therefore, are not readily adaptable to common usage.

Prior art examples of identification systems known to the current inventor include U.S. Pat. No. 3,648,240 granted to Jacoby et al, Mar. 7, 1972, which electroptically gauge predetermined dimensions of a human hand.

U.S. Pat. No. 4,699,149 granted to Rice, Oct. 13, 1987, discloses identification means using subcutaneous blood vessels utilizing infrared or thermal radiation.

U.S. Pat. No. 4,785,171 granted to Dowling Jr. et al, Nov. 15, 1988, utilizing light transmitted through fibre optics to determine finger print characteristics.

The patent to Bellin, number 4,857,916 granted on Aug. 15, 1989, discloses an identification system utilizing the unique characteristics of a person's grasp to identify an individual.

U.S. Pat. No. 4,932,776 granted to Dowling Jr. et al, Jun. 12, 1990, wherein a high intensity light is transmitted through a finger or the like and the image is projected via a bundle of fibre optics.

U.S. Pat. No. 4,946,276 granted to Chilcott, Aug. 7, 1990, utilizes an optical end coder and by rotating the finger allows a finger nail-to-finger nail scan of the subject's finger for identification purposes.

U.S. Pat. No. 5,088,817 granted to Igaki et al Feb. 18, 1992, utilizing the differential in the color of the skin when the finger or other object is pressed against the lens to assist in preventing the fraudulent use of the device.

U.S. Pat. No. 5,230,025 granted to Fishbine et al Jul. 20, 1993, discloses a method for recording finger print data of a finger rolled across a planar surface in a manner which is more realistic than utilizing the common ink method.

U.S. Pat. No. 5,335,288, granted to Faulkner Aug. 2, 1994, discloses a biometric measuring apparatus for recognizing a person's identity based measurements performed upon a person's hand.

U.S. Pat. No. 5,351,303 granted to Willmore, Sept. 27, 1994, senses and compares a unique infrared image pattern from an individual finger with the pattern of the same finger within memory components of the system.

DISCLOSURE OF THE INVENTION

With the above-known prior art in mind, it is an object of the present invention to provide a unique method of individual identification used in conjunction with a memory such that if there is a match, the individual identified will be able to do a desired act.

It is another object of the present invention to provide a personal identification system which operates quickly and efficiently utilizing unique characteristics of a person's hand and grip and allowing rapid identification of the individual.

It is still a further object of the present invention to encapsulate the identification portion of the identification system in a rod-like element, allowing the individual to grasp the element and be immediately identified.

It is yet another object of the present invention to provide a personal identification system of the size and memory such that it can be readily incorporated in common day-to-day situations.

BRIEF DESCRIPTION OF THE DRAWINGS

FIG. 2 is an illustrative drawing showing the present invention as mounted to a door or the like.

FIG. 4 is an illustration of the invention prototype.

FIG. 5 is part sectional view of the apparatus of FIG. 4.

FIGS. 6, 7 and 8 are various configurations for the source of infrared light, as well as the receptive fibre optics.

BEST MODE FOR CARRYING OUT THE INVENTION

Figure 1:
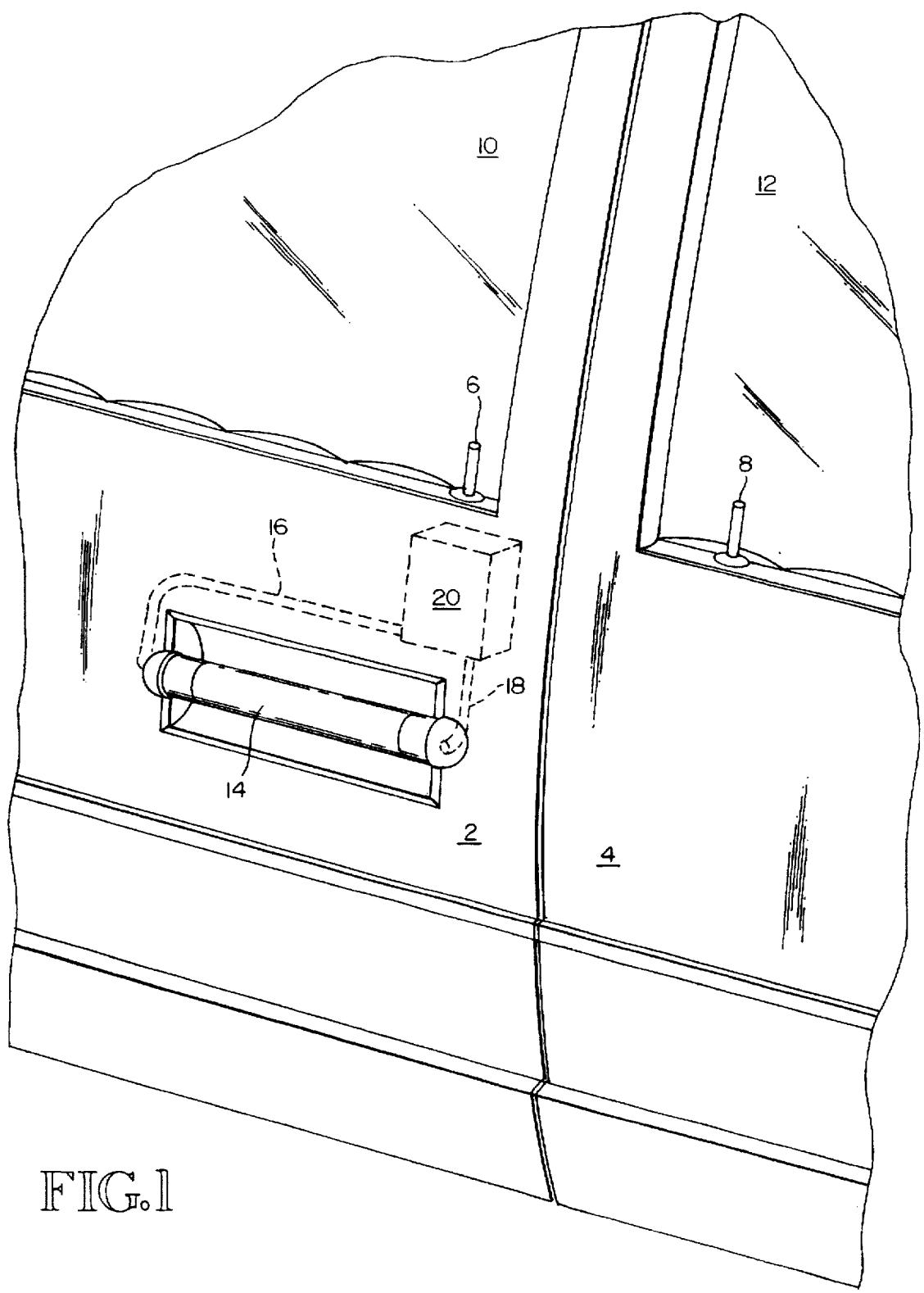
FIG. 1 is an illustrative view showing the present invention installed on the exterior of an automobile.

As seen in FIG. 1, the device is installed in place of an automobile door handle and, as seen in this figure, the doors 2,4 each have locking mechanisms 6,8 mounted inside the glass window 10, 12. The inventive device itself includes a recognition element 14 to be described in detail hereinafter which includes connections by conduits 16,18 which contain the source of infrared light as well as the fibre optic receptor and connect them to the microprocessor as shown in block form 20. Those persons who are authorized to drive the vehicle would have their hand characteristics, including temperature, location of blood vessels, size and location of bones, as well as any other material aspects which would differentiate one person from another stored in the microprocessor. The placement of a hand around the grip reading device 14 would cause an instant comparison to be made between the hand on the grip and the characteristics as found in the memory and decide whether or not to provide admission to that particular person.

It is contemplated that the device could also detect blood flow and characteristics of the grip itself.

Although the device is shown as an example as a part of the car door handle, it is envisioned that it could equally as well be utilized as part of some other portion of the vehicle such that, in the event of an unauthorized entry, the device would either shut down the vehicle so that it could not operate, or, in the alternative, if it were already operating, allow it to move a certain distance before it would shut down. It is envisioned that in the event there is an unauthorized entry, the portion of the program would include notifying officials such as police of the unauthorized entry, perhaps sounding an alarm and, most certainly, arming the emergency flashing lights.

Figure 2:
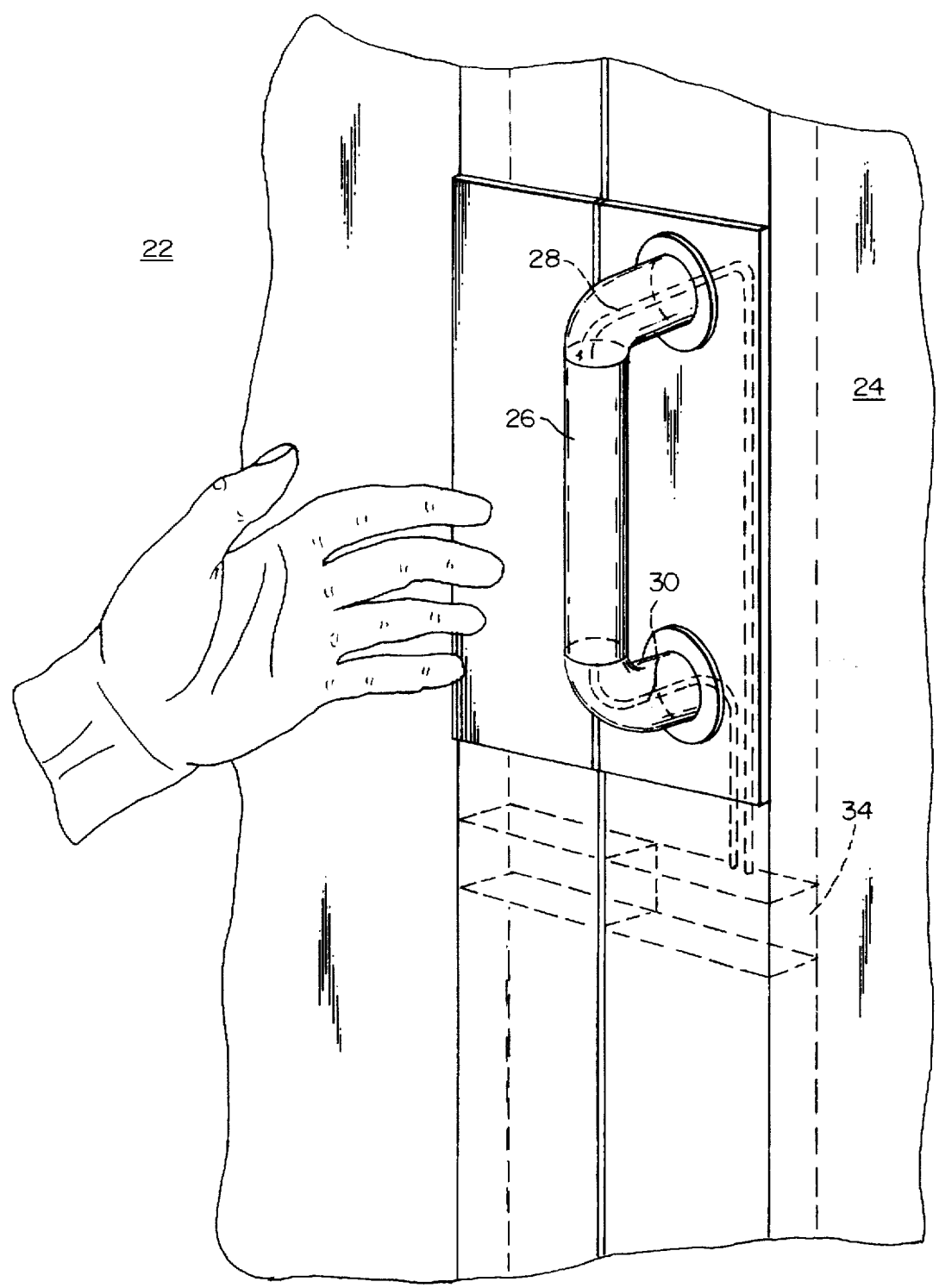

As seen in FIG. 2, a building wall 22 is shown having a closed door 24 in the secured position. The grip reading device 26 is mounted to a door 24 and includes conduits 28, 30 leading to a microprocessor 34 which would, upon identifying the grip as one of a person was authorized to enter that particular area via the prerecorded characteristics in its memory, unlock the door 24 and allow entry.

Figure 3:
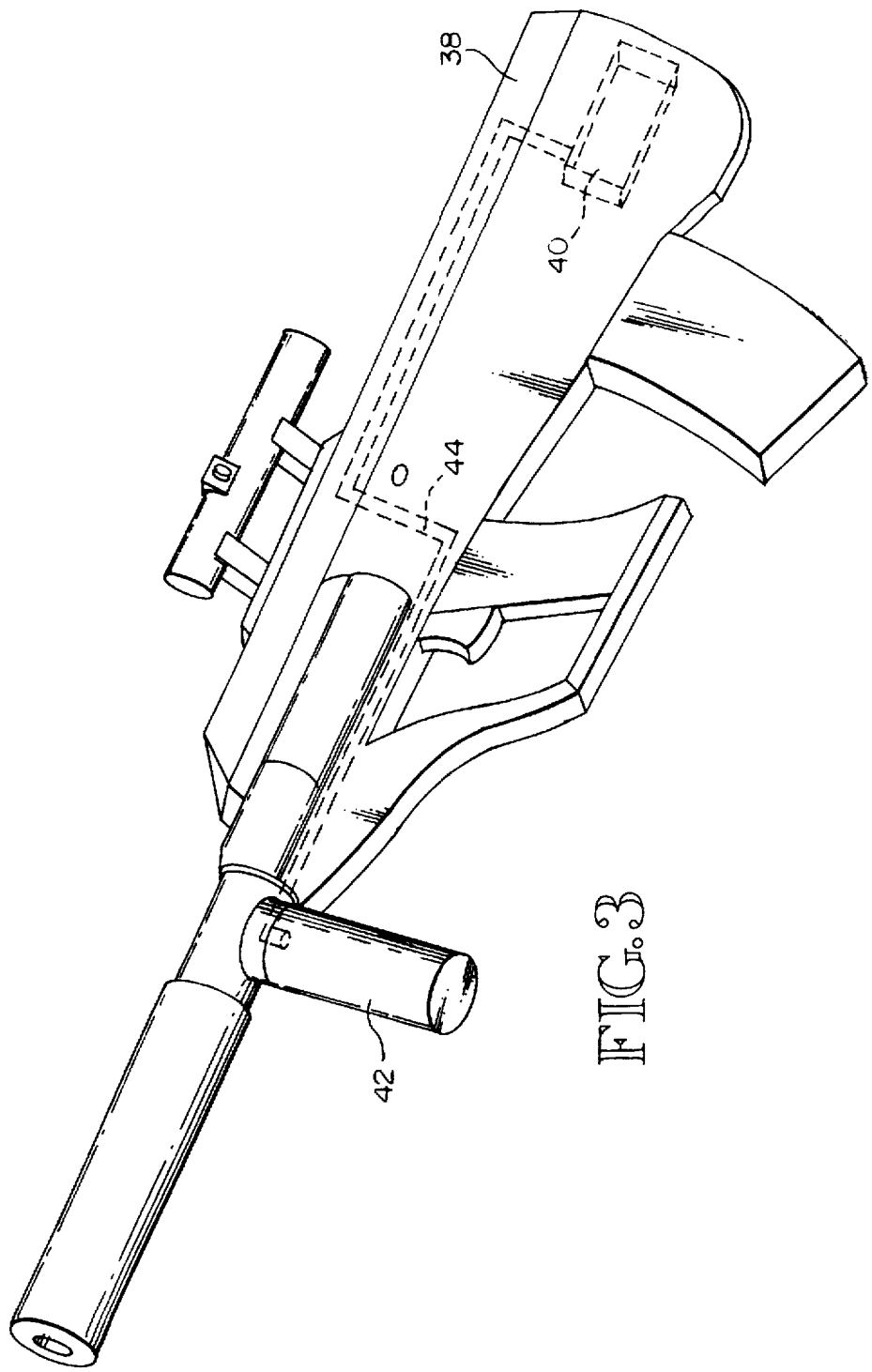
FIG. 3 is an illustrative drawing showing the present invention as contained in a weapon.

As seen in FIG. 3, a similar installation could be utilized in a weapon 38, wherein the microprocessor 40 could be buried within the stock, and the grip reading device 42 being attached to the front of the gun as an additional handle with the conduits 44 interconnecting the grip reading device and the microprocessor.

It is deemed to be obvious that in the event of the rifle, there would be a necessary battery source which likewise could be buried within the stock, in the case of the automobile, the automobile electrical system could be used to power the microprocessor identification device and, of course, in the case of a building door power would be readily available.

Referring now to FIG. 4 which depicts the original prototype, the hand grip recognition system 50 is shown and housings 52,54 hold the mechanical aspect of the device, whereas in the present prototype the electronics were computer driven by a PC which was functionally connected to the scanning device. The program loaded into the PC controlled the motion of the scanner and other aspects of the fibre optics and the infrared light. The prototype proved the feasibility of the concept, the ability to store the information and make a comparison being known.

Referring now to FIG. 5, it can be seen that the grip reading device 50 is a transparent plastic tube which houses a reading head 54 which includes both an infrared light 56 and a fibre optic strand 58. The carrier 54 is designed to be driven by two step motors 60 (upper) and 62 (lower) such that the carrier rotates through 360°, descends or ascends in steps a predetermined distance on carrier rod 64 until the entire interior of the hand is scanned. It is to be noticed that the power cord of the infrared light and the fibre optic are both coiled about the entire interior of the tube 50 such that they can expand and contract in the way of a spring as the reading head 54 is rotated and moved vertically. The lower section of the device contains the control circuit for the device and the wiring to and from the computer as well the motor controls for both the top and bottom sections.

Figure 6:
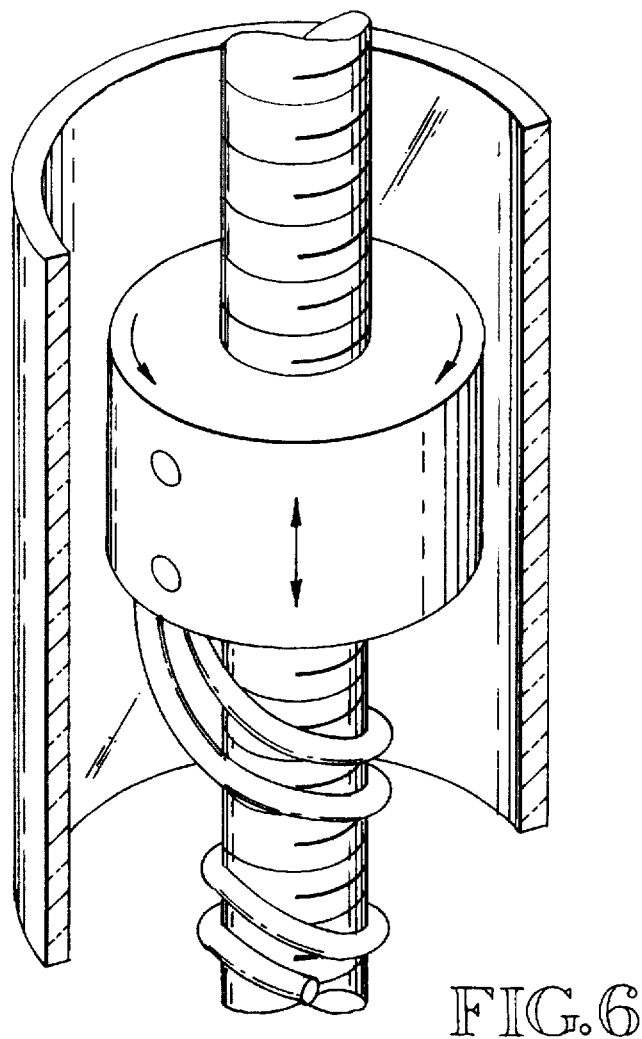

As seen in FIGS. 6, 7, 8 and three alternate reading devices are shown, the one in 6 similar to those shown in FIGS. 4 and 5. The one in FIG. 7 includes a linear row of fibre optics which need only be rotated and FIG. 8 has the fibre optics embedded in a radial fashion throughout a solid, transparent tube for instant readout. Of course, each of the reading devices would include a source of infrared light to penetrate the hand surface.

Thus, as can be seen, the present invention includes a means of personal identification which is more detailed and individual and renders it much more difficult to override the system. The critical aspects of each of the illustrative applications lies in the fact that the identification element be of a size and shape that is easily grasped by the hand, allowing a scan and comparison of the internal structure of the hand.

We claim:

1. A security device including a preprogrammed identifying means wherein the input comprises a device to be grasped by the hand of the person to be identified, said device comprising an elongated transparent cylindrical exterior shell, a source of infrared light mounted within the shell of sufficient intensity to penetrate at least the surface of the skin of a person grasping the shell, a scanning device including at least one fiber optic strand within the shell to scan the hand grasping the device recording the internal structure and transmitting the data to the identifying means to confirm or deny identity.

2. A security device as in claim 1 wherein the scanning device includes a plurality of fiber optic strands mounted in a row within the exterior shell along its longer dimension, said row adapted to rotate about the axis of the shell to scan the hand grasping the shell.

3. A security device as in claim 1 wherein the scanning device comprises a plurality of radially mounted fiber optic strands such that the scan may be made instantaneously.

4. A security device as in claim 1, wherein the strand moves along the long dimension of the shell while simultaneously rotating about an axis of the shell to scan the hand grasping the shell.

5. A security device including a preprogrammed identifying means wherein the input comprises a device grasped by the hand of a person to be identified and wherein the grasped device is a rigid elongated shell, is transparent and includes a light source emitting a light beam capable of penetrating at least the skin of the hand grasping the device; and scanning means to scan the hand grasping the device, recording the subcutaneous structure of the hand, and transmitting the data to the identifying means to process the data and compare it with data previously stored to confirm or deny identity.

6. A security device as in claim 5, wherein the grasped device is substantially cylindrical.

* * * * *